United States Patent
Wolter

(10) Patent No.: US 8,393,153 B2
(45) Date of Patent: Mar. 12, 2013

(54) METHOD, DEVICE, AND SYSTEM FOR CONVERTING ENERGY

(75) Inventor: Klaus Wolter, Düsseldorf (DE)

(73) Assignee: Klaus Wolter, Dusseldorf (DE)

(*) Notice: Subject to any disclaimer, the term of this patent is extended or adjusted under 35 U.S.C. 154(b) by 684 days.

(21) Appl. No.: 12/225,898

(22) PCT Filed: Mar. 29, 2007

(86) PCT No.: PCT/EP2007/053015
§ 371 (c)(1), (2), (4) Date: Jun. 17, 2009

(87) PCT Pub. No.: WO2007/113200
PCT Pub. Date: Oct. 11, 2007

(65) Prior Publication Data
US 2009/0288410 A1 Nov. 26, 2009

(30) Foreign Application Priority Data

| Mar. 31, 2006 | (DE) | 10 2006 015 527 |
| Apr. 4, 2006 | (DE) | 10 2006 016 111 |
| May 3, 2006 | (DE) | 10 2006 020 752 |
| Sep. 25, 2006 | (DE) | 10 2006 045 559 |
| Nov. 9, 2006 | (DE) | 10 2006 053 180 |
| Mar. 1, 2007 | (WO) | PCT/EP2007/051940 |

(51) Int. Cl.
*F01K 7/00* (2006.01)
*F01K 27/00* (2006.01)
*F03G 7/04* (2006.01)

(52) U.S. Cl. .................. 60/675; 60/641.1; 60/641.6

(58) Field of Classification Search .............. 60/675, 60/641.1; 415/916
See application file for complete search history.

(56) References Cited

U.S. PATENT DOCUMENTS

| 1,343,577 | A | * | 6/1920 | Perry | 60/641.1 |
| 2,265,878 | A | * | 12/1941 | Stoker | 60/675 |
| 3,987,632 | A | | 10/1976 | Pereda | |
| 4,095,429 | A | * | 6/1978 | Morey | 60/675 |
| 4,187,686 | A | * | 2/1980 | Pommier | 60/647 |

(Continued)

FOREIGN PATENT DOCUMENTS

| DE | 3037777 | 7/1982 |
| DE | 3445785 | 6/1986 |

(Continued)

OTHER PUBLICATIONS

Wikipedia; "Biosphere 2"; http://en.wikipedia.org/wiki/Biosphere_2; Nov. 22, 2012.

(Continued)

*Primary Examiner* — Kenneth Bomberg
*Assistant Examiner* — Christopher Jetton
(74) *Attorney, Agent, or Firm* — Ware, Fressola, Maguire & Barber LLP

(57) ABSTRACT

To convert energy, firstly a non-gaseous carrier medium is converted into a gaseous carrier medium by the introduction of thermal energy, so that the gaseous carrier medium rises and gains potential energy. Then the gaseous carrier medium is converted back at a specified height into a non-gaseous carrier medium. The potential energy of the recovered non-gaseous carrier medium can then be converted into another desired energy form.

32 Claims, 6 Drawing Sheets

U.S. PATENT DOCUMENTS

| | | | |
|---|---|---|---|
| 4,244,189 A * | 1/1981 | Bliamptis | 60/641.11 |
| 4,291,232 A | 9/1981 | Cardone et al. | |
| 4,292,809 A * | 10/1981 | Bjorklund | 60/676 |
| 4,306,416 A * | 12/1981 | Iozzi | 60/641.11 |
| 4,318,275 A * | 3/1982 | Brown et al. | 60/675 |
| 4,382,365 A * | 5/1983 | Kira et al. | 60/675 |
| 4,391,100 A * | 7/1983 | Smith | 60/641.11 |
| 4,856,281 A | 8/1989 | Taylor | |
| 4,896,509 A | 1/1990 | Tamura et al. | |
| 5,488,828 A * | 2/1996 | Brossard | 60/675 |
| 5,704,209 A | 1/1998 | Bronicki et al. | |
| 6,434,941 B1 * | 8/2002 | Narutomi et al. | 60/641.1 |
| 6,434,942 B1 * | 8/2002 | Charlton | 60/641.11 |
| 7,658,072 B2 | 2/2010 | Masada | |
| 2003/0005697 A1 | 1/2003 | Alexander | |

FOREIGN PATENT DOCUMENTS

| | | |
|---|---|---|
| DE | 3619269 | 12/1987 |
| DE | 19517897 | 11/1996 |
| EP | 0082671 | 3/1990 |
| JP | 63179104 | 7/1988 |
| JP | 06-081611 | 3/1994 |
| JP | 2001-323870 | 11/2001 |
| JP | 2002-195009 | 7/2002 |
| LU | 42538 | 12/1962 |
| RU | 2160370 | 12/2000 |
| SU | 1019164 | 5/1983 |
| WO | WO 96/01363 | 1/1996 |
| WO | WO 03/095802 | 11/2003 |
| WO | WO 2007/113062 | 10/2007 |
| WO | WO 2007/113200 | 10/2007 |

OTHER PUBLICATIONS

Wikipedia; "Water Cycle"; http://en.wikipedia.org/wiki/Water_cycle; Nov. 22, 2012.

* cited by examiner

METHOD, DEVICE, AND SYSTEM FOR CONVERTING ENERGY

CROSS REFERENCE TO RELATED APPLICATIONS

This application is the U.S. National Stage of International Application Number PCT/EP2007/053015 filed on Mar. 29, 2007 which was published on Oct. 11, 2007 under International Publication Number WO 2007/113200.

TECHNICAL FIELD

The invention concerns a method, a device and a system for converting energy.

BACKGROUND OF THE INVENTION

One example for a device for converting energy is a solar chimney power plant. For a solar chimney power plant, air is heated by the sun and supplied to a chimney in which it rises. A turbine arranged in the chimney can generate electrical power from the air flow.

SUMMARY OF THE INVENTION

The invention is based on the consideration that in these and similar devices to convert energy, the energy present is not utilised optimally.

The invention provides an alternative or additional approach for converting existing thermal energy which allows the conversion to be performed more efficiently than is the case in these known devices.

A method is proposed for converting energy that comprises the following steps:
 a) conversion of a non-gaseous carrier medium into a gaseous carrier medium by the introduction of thermal energy so that the gaseous carrier medium rises and gains potential energy;
 b) back conversion of the gaseous carrier medium at a specified height into a non-gaseous carrier medium; and
 c) conversion of the potential energy of the recovered non-gaseous carrier medium into another energy form.

Furthermore, a device is proposed for conversion of energy. The device comprises a cavity. The device further comprises an aggregation state changer arranged at the lower end of the cavity and configured to convert a non-gaseous carrier medium into a gaseous carrier medium by the introduction of thermal energy so that the carrier medium rises in the cavity and gains potential energy. The device furthermore comprises a collector arranged at the upper end of the cavity and configured to collect a non-gaseous carrier medium recovered from the gaseous carrier medium. The device furthermore comprises an energy conversion arrangement configured to convert the potential energy of the recovered non-gaseous carrier medium into another energy form.

Finally, a system is proposed that comprises such a device and also a device configured to recover thermal energy which is made available to the aggregation state changer.

It is thus proposed that the thermal energy present is used to gain potential energy which can then be converted again into the desired energy form. The potential energy is recovered in that a non-gaseous, i.e. solid or liquid, carrier medium is changed into a gaseous aggregation state and rises as a result. Converted back into a non-gaseous aggregation state, the carrier medium with introduced potential energy is then available for energy recovery.

It is an advantage of the invention that it allows efficient energy conversion of existing thermal energy to a desired energy form. It can also be implemented with relatively small constructional dimensions.

On suitable selection of the thermal energy introduced, the invention can furthermore be implemented so that it is totally emission-free. In general, however, any energy source can be used to obtain the thermal energy required. The thermal energy introduced can be recovered from geothermal heat, water heat, air heat, a fossil energy carrier, a nuclear energy carrier and/or solar energy.

The thermal energy can be introduced exclusively at the exit point of the rising carrier medium, according to the device therefore exclusively via the aggregation state changer. In an alternative approach the thermal energy can also be introduced into the carrier medium distributed over the height traveled by the gaseous carrier medium.

For this, the device may have a corresponding energy introduction element. Such an energy introduction element can itself comprise an energy recovery element or be supplied with energy from an energy recovery element.

The introduction of thermal energy distributed over the height has the advantage that in total less external thermal energy need be supplied. Thus, at selected heights or continuously along the height of a cavity, exactly enough energy can be introduced for the carrier medium to remain in the gaseous state until it reaches the specified height.

In addition, the invention can be implemented substantially more compactly and economically if, for example, solar collectors, used as energy recovery and introduction elements, are applied directly onto the shell of a cavity in which the gaseous carrier medium rises, or even form this shell in full or in part.

The energy introduction element can completely surround a cavity in which the carrier medium rises, or for example in the case of solar collectors be arranged only on the side facing the sun. Furthermore, the element can extend over the entire height of the cavity or be arranged only at a selected height section or at several selected height sections.

In an example embodiment, the back-conversion of the gaseous carrier medium into a non-gaseous carrier medium can take place by cooling the gaseous carrier medium. Cooling can take place by means of a cooling unit.

Cooling can take place, for example, if a transport medium is guided through cooling areas, e.g. of a cooling unit, arranged at the specified height. The cooling areas can be formed by hoses or other lines. The cooling areas can be formed and arranged so that at the same time they can be used to divert the recovered non-gaseous carrier medium into a provided collection point.

If cooling takes place via a transport medium, a heating of the transport medium resulting from the cooling of the carrier medium can be utilised to make a contribution to the thermal energy introduced. According to the device, a heat recovery line can be provided for this, which supplies the heated transport medium to the aggregation state changer arranged at the lower end of the cavity. Such an embodiment has the advantage that it is particularly efficient as during operation only the lost energy, including the consumed useful energy, need be introduced from the outside.

In an alternative or additional embodiment, to support the back-conversion a substance can also be introduced directly into the gaseous carrier medium, for example through a correspondingly designed collector. The introduction can take place by spraying or showering. After the substance has extracted heat from the carrier medium and hence supported the condensation, substance and carrier medium can be separated again for further use. This can, for example, take place in a simple manner if the carrier medium is water and the substance oil. Instead, however, also the carrier medium already recovered can be sprayed or showered into the rising gaseous carrier medium before it is supplied for energy conversion of the potential energy contained. The resulting enlarged collision surface for the rising, still gaseous carrier medium also supports the back-conversion. Here, it should be merely ensured that the sprayed or showered carrier medium does not fall back into the aggregation state changer but is supplied to the energy conversion device. This can be achieved, for example, if the carrier medium is sprayed or showered into an area of the cavity that is angled at the upper end.

In a further example embodiment active cooling for the carrier medium for back-conversion can be omitted. The back-conversion of the gaseous carrier medium into a non-gaseous carrier medium at the specified height can, for example, take place because of cooling of the gaseous carrier medium on the upward movement. The height of the cavity can be selected suitably for this. More precisely, the height is set in proportion to the heat introduced to the carrier medium so that cooling from the upward movement generates a vapour which is subcooled so far that auto-condensation begins at the height of the collector. Such auto-condensation can be supported by suitable design of the collector. The collector could, for example, be formed as a net or a plurality of nets which serve as large collision surfaces in order to generate or further condense a condensation mist and/or condensate.

It is, however, evident that both with active cooling and without active cooling, the collector can equally simply comprise an upper limiting surface of the cavity that is cooled where applicable and formed so that it guides the back-converted non-gaseous transport medium, for example, via a collector basin to the energy conversion device.

In an example embodiment the recovered non-gaseous carrier medium is temporarily stored before conversion of the recovered potential energy of the carrier medium into another energy form, for example by means of an intermediate store.

Intermediate storage of the recovered non-gaseous carrier medium is suitable, for example, for supplying a reserve for times in which no external thermal energy is available. Furthermore, with intermediate storage, peak demand for the desired energy form can be covered or peaks in the supply of the recovered non-gaseous carrier medium can be buffered.

To convert the potential energy of the carrier medium into another energy form, the potential energy can firstly be converted into kinetic energy. This can be achieved if the recovered non-gaseous carrier medium is dropped on a fall path from a greater height to a lesser height, through a downpipe for example. The kinetic energy can then be converted into another energy form. For this, an energy converter can be provided such as a turbine, where applicable with a subsequent generator.

In the final result, the potential energy can be converted into any arbitrary energy form. It is evident that conversion into a desired energy form also comprises storage in a desired energy carrier. Thus, amongst others, conversion is possible into mechanical energy, electrical energy, energy to generate a chemical energy carrier and/or energy to generate a physical energy carrier.

Also, the recovered non-gaseous carrier medium can be temporarily stored, if required, in an intermediate store after conversion of the potential energy into another energy form. Instead or thereafter, the recovered non-gaseous carrier medium, after conversion of the potential energy into another energy form, can be further used at least partly in a closed circuit. According to the device, for this the carrier medium is returned to the aggregation state changer.

By conversion of the non-gaseous carrier medium into a gaseous carrier medium, the carrier medium depending on composition can furthermore be distilled. The distilled recovered non-gaseous carrier medium can then be at least partly extracted via an extraction point before or after conversion of the potential energy into another energy form.

If, for example, sea water is used as the carrier medium, in simplified terms water evaporates, the dissolved gases are released and salts precipitated. In the condensation area at the specified height primarily pure water is then available. This opens up multiple possibilities for application and embodiment such as drinking water recovery and irrigation. If used water or waste water from industry or households is used as the carrier medium, then by means of distillation used water or waste water cleaning can take place and recovery of the residual substances.

The gaseous carrier medium can rise in a cavity that apart from any contaminants contains no further substances.

Alternatively, the cavity can also comprise a filling medium which is carried along by the rising gaseous carrier medium. Air or any other gas or gas mixture could be used as the filling medium.

Use of a filling medium allows compensation for pressure differences between the cavity and outer environment. Such pressure differences can arise because of different operating temperatures provoked by changes in aggregation state of the carrier medium. As the filling medium is carried along by the carrier medium, a closed circuit can be provided for the filling medium in which the filling medium, after removal of the carrier medium at the specified height, is made available again to the evaporator. Alternatively, an open system can also be provided in which the filling medium is drawn in from the outside by the drawing up within the cavity and after use discharged again towards the outside.

In general, for all substances used and not extracted for external use, such as carrier medium, transport medium and filling medium, and for all energy not extracted for external use, embodiments with closed circuits and open passages can be used.

BRIEF DESCRIPTION OF THE DRAWINGS

The invention is now explained in more detail below with reference to an example embodiment. Here.

DETAILED DESCRIPTION

Figure 1:
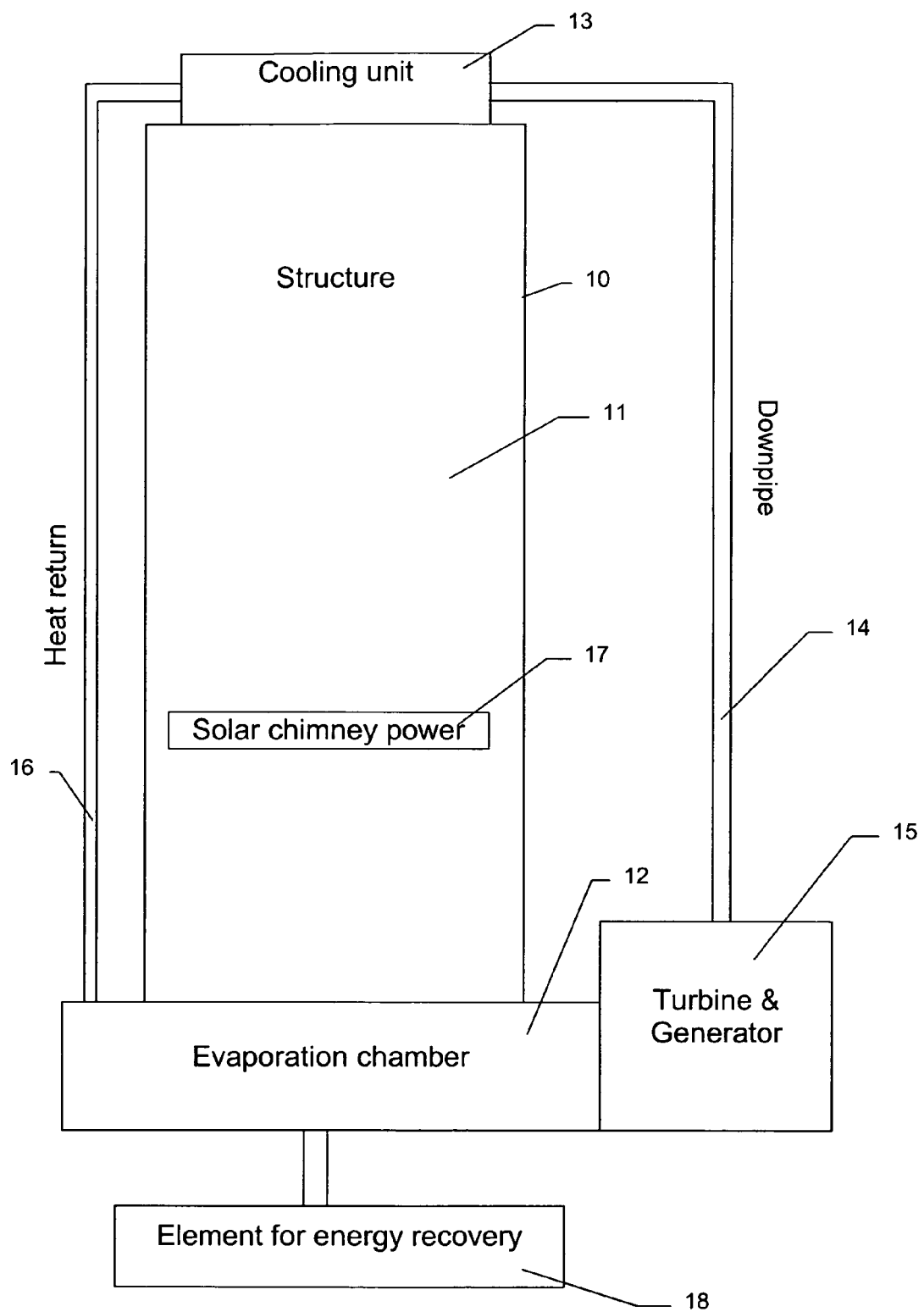
FIG. 1 shows diagrammatically the structure of an example device according to the invention.

FIG. 1 shows an example embodiment of a device according to the invention for efficient conversion of energy.

The device comprises a structure 10 with a cavity 11. Evidently, the cavity, in an alternative embodiment, can also be arranged obliquely for example adjacent to the side of a hill. At the lower end of the cavity 11 at height h=h$_0$ an evaporation chamber 12 is arranged.

At the upper end of the cavity 11 at height h=h$_1$ a cooling unit 13 is arranged. From the cooling unit 13 a downpipe 14 leads to a turbine 15 with a connected generator. The turbine 15 is in turn connected to the evaporation chamber 12. The cooling unit 13 is furthermore connected via a heat return line 16 to the evaporation chamber 12.

In the cavity, is arranged furthermore, optionally, the turbine of a conventional solar chimney power plant 17.

Finally, an element 18 for thermal energy recovery is arranged such that it can supply thermal energy to the evaporation chamber 11. One example of such an element is a solar collector. Instead of the sun, however, any other energy source can be used by the element 18. It is furthermore evident that a multiplicity of such elements can be provided.

Figure 2:
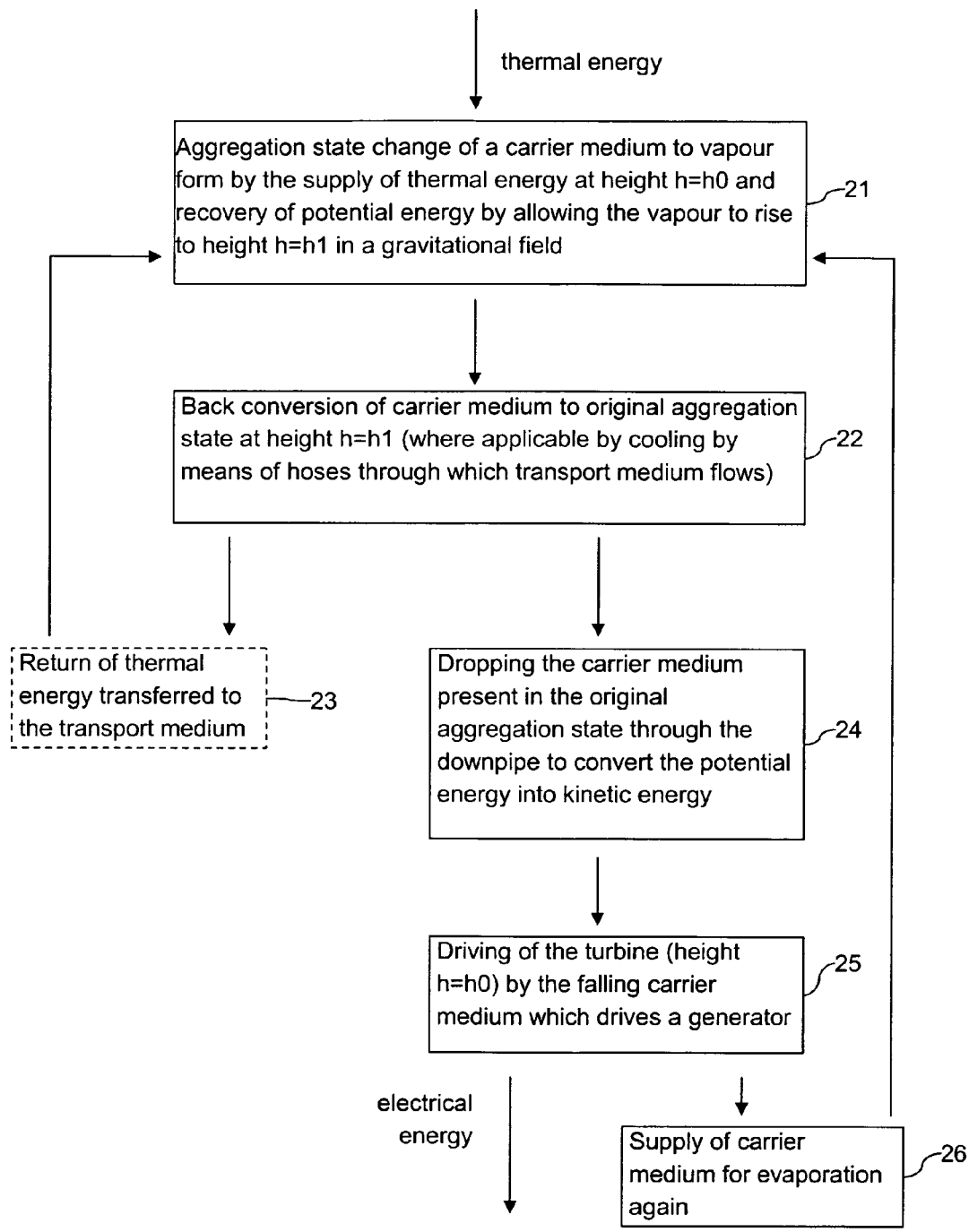
FIG. 2 shows a schematic flow diagram which explains the operation of the device in FIG. 1.

FIG. 2 shows a flow diagram which clarifies the principle of operation of the device from FIG. 1.

In the evaporation chamber 12 is a carrier medium in the non-gaseous aggregation state, for example water as a liquid carrier medium.

External thermal energy is supplied to the evaporation chamber 12 by the element 18 for energy recovery (step 21).

Due to the thermal energy supplied, the carrier medium is converted into a gaseous aggregation state which means it vaporises and rises in the cavity 11.

At height h=h$_1$ the carrier medium is converted back into the previous aggregation state (step 22). This means the vapour out of the carrier medium condenses again. In the example shown the back-conversion is caused by a cooling unit 13. Such a cooling unit can, for example, consist of a network of hoses. The network offers firstly a large collision surface in order to generate or condense a condensation mist. Secondly, a transport medium can flow through the hoses as coolant that supports condensation on the network. The network diverts the resulting condensate in the direction of the downpipe 14.

The transport medium heated in the hoses can be supplied via the heat return line 16 to the evaporation chamber 12 in order there to support the effect of the introduced thermal energy and then in the cooled state be supplied again to the cooling unit 13 (step 23).

The carrier medium, because of the height h$_1$-h$_0$ traveled, now has added potential energy. It is dropped through the downpipe 14 so that kinetic energy is obtained from the potential energy (step 24).

This kinetic energy can now be converted into other desired energy forms (step 25). For example, the falling carrier medium can drive the turbine 15 and the resulting rotation energy can be used to operate the connected generator and generate electrical energy.

After the carrier medium has driven the turbine 15 it can be guided again to the evaporation chamber 12 (step 26).

The optional solar chimney power plant 17 can also use the rising vapour from the carrier medium between step 21 and step 22 in a conventional manner to recover energy.

Figure 3:
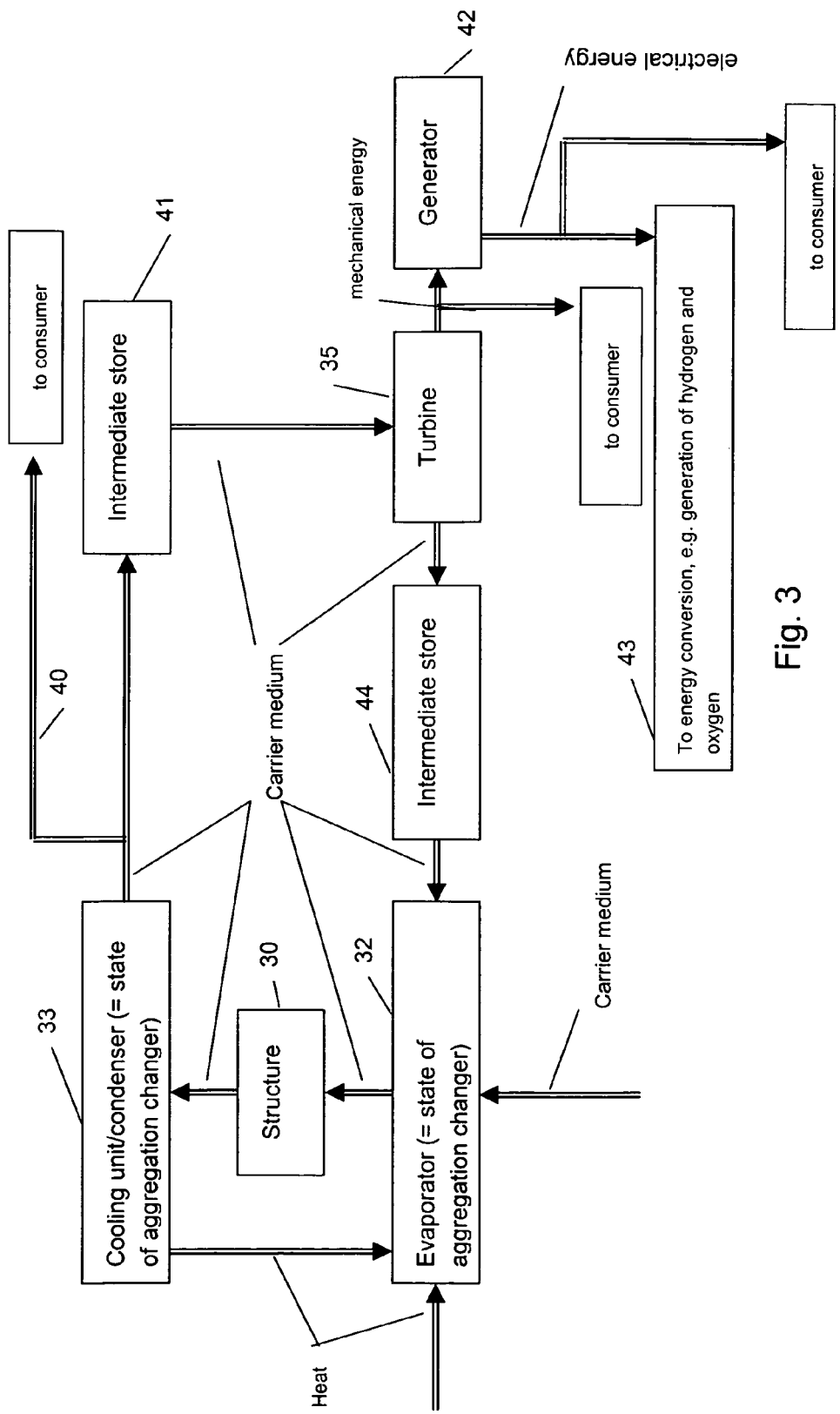
FIG. 3 shows a schematic block diagram of an example device according to the invention.

Some selected details and possible variations of the device in FIG. 1 are shown in the block circuit diagram in FIG. 3.

A carrier medium is supplied to an evaporator 32 or more generally to an aggregation state changer. The carrier medium can, for example, be sea water. The evaporator 32 corresponds to the evaporation chamber 12 in FIG. 1. In the evaporator 32 the carrier medium is evaporated by means of thermal energy supplied.

The vapour rises in the cavity of a structure 30 until it reaches a second aggregation state changer 33. The cavity can also contain a filling medium which is carried along by the carrier medium in an open or closed circuit.

The second aggregation state changer 33 can, for example, correspond to the cooling unit 13 from FIG. 1 which causes as an active condensate collector a cooling of the vapour to support condensation. If the aggregation state changer 33 comprises a cooling unit, heat is returned to the evaporator 32.

Alternatively, the second aggregation state changer 33 can be a condenser which as a passive condensate collector simply collects the condensate resulting from the vapour. In this case, the height of the structure is advantageously dimensioned such that because of cooling of the vapour in the upward movement, auto-condensation occurs at the level of the condenser, for example on a network that can be included by the condenser to collect and divert condensate.

If evaporation and condensation are to be used simultaneously to distil the carrier material, part of the condensed carrier medium can be supplied directly to a consumer via an extraction connection 40. If the carrier medium, for example, is sea water, the salts contained are precipitated on evaporation and part of the condensed carrier medium can be used as drinking water or for irrigation.

The part of the condensed carrier medium not extracted is supplied to an intermediate store 41, for example a water tank which is also arranged substantially at the height of the second aggregation state changer 33. The intermediate storage allows recovery of the desired energy form at a desired time. This also includes greater recovery of the desired energy form at peak load times and/or temporally even spread of recovery of the desired energy form if the thermal energy supplied is only, for instance, available at specific times and therefore condensate can only be obtained at specific times.

The condensed carrier medium is then, controlled as required, dropped through a downpipe so that it strikes a turbine 35 and drives it. The rotation energy generated by the turbine 35 can either be used directly by a consumer and/or supplied to a generator 42 to generate electrical energy.

The electrical energy can in turn either be supplied directly to a consumer or used for further energy conversion 43, e.g. to produce hydrogen or oxygen.

After the condensed carrier medium has driven the turbine 35, it can be temporarily stored in a further intermediate store 44 in order then to be again supplied to the evaporator in a closed circuit. It is evident that distilled carrier medium can also be extracted via an extraction connection before or after the second intermediate store 44 so that a greater quantity of carrier medium is available to drive the turbine.

Where condensed carrier medium is extracted from the circuit, it is also supplied again to the evaporator 32 from the outside e.g. in the form of further sea water.

Figure 4:
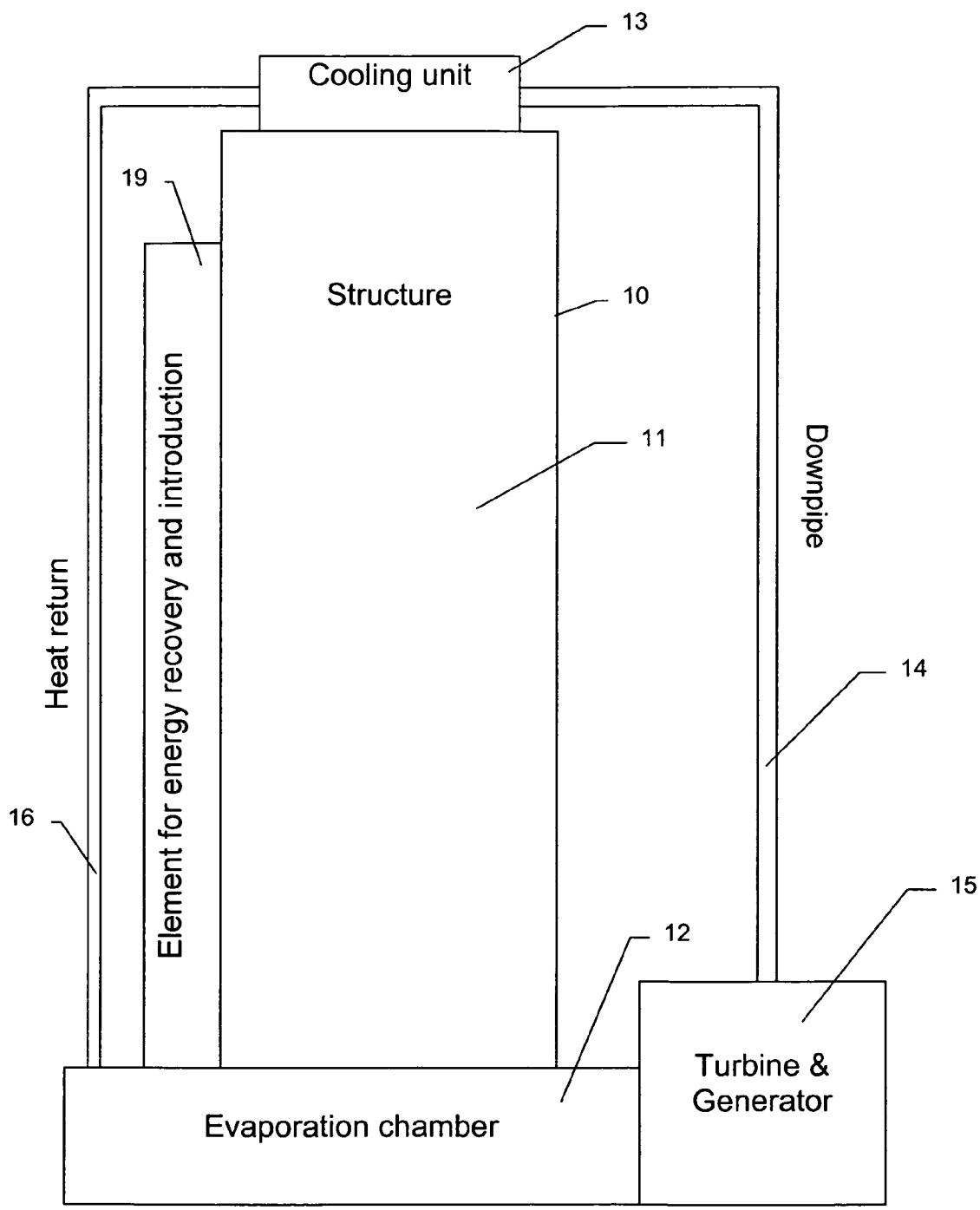
FIG. 4 shows diagrammatically the structure of a further example device according to the invention.

FIG. 4 shows a further variation of the device of FIG. 1 as a further embodiment example of a device according to the invention for efficient conversion of energy. The same components carry the same reference numerals as in FIG. 1.

In this embodiment example, an evaporation chamber 12, a structure 10 with a cavity 11, a cooling unit 13, a downpipe 14, a turbine 15 and a heat return 16 are again arranged as in the example of FIG. 1.

In the embodiment according to FIG. 4, however, an element 19 is provided for recovering and feeding the thermal energy along the shell of the cavity. The element 19 can, for example, be a solar collector. The element 19 introduces thermal energy distributed over the height of the cavity into a rising gaseous carrier medium so that auto-condensation before reaching the cooling unit 13 is prevented.

Then only sufficient energy need be supplied to the evaporation chamber 12 as is required for conversion of the non-gaseous carrier medium into a gaseous carrier medium. In continuous operation for this possibly the heat returned via the heat return 16 from the cooling unit 13 may suffice. Only for start of operation must external heat be supplied to the evaporation chamber, or at first non-gaseous carrier medium is sprayed into the cavity 11 so that initially it is converted into vapour first in the cavity 11 itself.

Beyond, the device in FIG. 4 works like the device in FIG. 1.

In other words, the invention and some embodiments can be described as follows:

The method and/or the device to recover energy is based on the collection and conversion of thermal energy via the route of gaining potential energy in the gravitational field of a mass ($E_{pot}$=m*g*h; 'm' being the mass raised in height in kilogrammes, 'g' the gravitational constant, and 'h' the height), into energy and/or energy carriers which we need or believe we need to structure our environment.

The physics utilised here to recover energy is given by the introduction of energy into a change of aggregation state solid and/or liquid into aggregation state gaseous and back, and by the gas dynamics in the form of adiabatic expansion which takes place after a change of aggregation state into the gaseous form. Adiabatic expansion leads to a chimney effect which plays a role in this method and/or device. Finally, this leads to a conversion of energy in the form of heat into energy stored in the gravitational field which can and/or is then converted back into other energy forms.

The method and/or device to recover energy is a "heat pipe" in basic principle but with decisive changes and extensions. This is arranged in the gravitational field of the mass such that for a movement from its one end to the other (=height h), energy must be expended to overcome a difference in potential of the gravitational field. For example, transferred to the case "earth", this means that one end is e.g. at ground level (height $h_0$=0) and the other end is at height $h_1$>0 above ground.

The functional basic principle of operation of the method and/or device for recovering energy is described as follows (FIG. 3): a substance (=carrier medium) is transformed by means of externally introduced energy into the gaseous aggregation state, then by the physical effects of adiabatic expansion playing the major role transported to height h and there converted back (=condensed) into the previous aggregation state. The substance with introduced potential energy is then available for energy recovery. Optionally, it can be stored temporarily at this height for later use. The potential energy can then be converted by means of corresponding devices and/or methods into other physical or chemical energy forms, i.e. extracted from the carrier medium. After extraction of the potential energy, the substance can optionally again be temporarily stored. Then optionally, if planned in the corresponding embodiment, the carrier medium can be returned to the circuit.

To implement the method and/or device to recover energy, in one embodiment a circuit with the following elements is established (see also FIG. 1):

An evaporation chamber to evaporate a carrier medium by means of introduced external heat, connected thereto a structure of height h in which the vapour can rise and in which a solar chimney power plant can be installed, connected thereto in one embodiment a cooling unit (=cooling device) to recover condensate from the vapour of the carrier medium, in another embodiment the height h is set in relation to the heat introduced into the carrier medium such that the cooling through the upward movement (that is the physical process of converting heat (=microscopic movement) into macroscopic movement, that is the synchronous movement of the molecules/atoms—the chimney effect) generates a vapour subcooled to the point that in the best case auto-condensation begins and a cooling unit is not required, then in one embodiment condensate collectors/condensers are provided e.g. in the form of networks which serve as large collision surfaces in order to generate or further condense a condensation mist/condensate, then not necessarily connected thereto an intermediate storage device for the condensate (necessary e.g. for the case of absence of external heat or to cover peak demand or to buffer peaks in condensate supply), connected thereto a downpipe for the condensate, connected thereto a turbine with associated generator in which the kinetic energy obtained from the potential energy of the condensate of the carrier medium via the fall in the downpipe can be converted e.g. into electrical energy (also can again be converted directly into heat), not necessarily connected thereto a further intermediate storage device for the condensate, and connected thereto again the evaporation chamber. Here the heat occurring in the cooling unit can again be introduced via a transport medium into the heating in the evaporation chamber.

To implement the method and/or device for recovering energy, various embodiments are possible. In the method and/or device described above, the carrier medium, apart from contaminants, is not necessarily the only gas within the structure of height h, in a further embodiment the structure of height h is also flooded with a filling medium (primarily air, but also any other gas/gas mixture can be used). The option of a filling medium arises from pressure differences between the cavities of the method and/or device and the external environment at different operating temperatures which are caused by changes in aggregation state. These can optionally be compensated by filling media, from which constructional measures arise for the design of the building object. As the filling medium is carried along by the carrier medium, this leads to at least two embodiments. Firstly a closed circuit for the filling medium which is made available in the evaporator again by a return device after removal of the carrier medium at height h, and secondly an open system where the filling medium is aspirated from the outside by the carrying along within the structure and after use discharged outside again.

From further consideration of the method and/or device for recovery of energy, a further benefit arises. As a side effect of the change in aggregation state of a used substance, depending on its composition a fractioned distillation occurs. If e.g. sea water is used as the carrier medium in an open circuit in the method and/or device to recover energy, in simple terms sea water evaporates, the gases dissolved are released and salts precipitated. In the condensation area of height h then mainly pure water is available which has already been pumped by means of the energy recovered without further intermediate steps to height h. From here again multiple applications and embodiments arise (key words: (drinking) water production, irrigation). If e.g. used water or waste water from industry and households is used, the method results in used water or waste water cleaning and recovery of residual substances.

Further embodiments consider in particular, optionally, the evaporation heat or evaporation enthalpy of the carrier medium concerned, which must be applied as latent heat on aggregation state change from liquid/solid to gaseous but then released again on reverse transformation designated sublimation or condensation heat. This is then optionally returned, by the return transport described above by means of the cooling unit, to the area of aggregation state change from liquid/solid to gaseous (see FIG. 3). This means that during operation from the outside only the lost energy need be introduced into the evaporator. This includes also the useful energy extracted. In total, these embodiments have the advantage of a far lower constructional cost for recovery of energy.

In a further embodiment the networks mentioned above are established by constructional design and arrangement of the cooling areas of the cooling unit, e.g. networks of hoses through which a coolant (=transport medium) flows.

In a further embodiment the recovery of evaporation heat and hence condensation are improved by spraying/showering/introduction of condensate which was previously cooled by the cooling unit in a further embodiment. In further embodiments the condensate can also be replaced by substances which achieve the same physical effect. (Example: in the case of the carrier medium water, the introduced substance to improve condensation could also be oil. This would have the advantage of simple separation of the two substances).

For all substances (carrier medium(a), transport medium (a), filling medium(a), energies (heat, electrical energy, mechanical energy, wind, kinetic energy)) and aggregation states in the method and/or device to recover energy, constructional solutions are possible with closed circuits or open passages.

The transport media used in this method and/or device only fulfil functional auxiliary tasks, e.g. as catalysts in chemical reactions, which however are again functionally necessary for implementation of the embodiment concerned. E.g. the return of heat that can be recovered in the cooling unit is organised via an optionally closed circuit of a transport medium back to the evaporator. Also, the transport medium in this process can but need not be subject to a change in aggregation state. This would be the case if this part of an embodiment were also designed as a "heat pipe". In another embodiment the heat transport medium, e.g. a fluid of higher boiling point (e.g. vegetable or mineral oil, salt melt etc.) comprises a gas that does not change its aggregation state on introduction of heat recovered in a cooling unit.

The thermal energy which drives this method and/or device can be taken from any arbitrary sources. E.g. ground (geothermal heat), water (water heat), air (air heat), fossil energy carriers (gas, oil, coal, methane ice etc.), nuclear energy carriers (fusion or fission) or sun (solar energy).

In further embodiments, the structure of height h (=chimney) coincides with the device for recovery of energy/heat, which drastically reduces the complexity and hence construction and installation costs. The physical/technical background for this is the consideration that the energy necessary for height transport by means of the chimney effect for the carrier medium need not necessarily be introduced into the evaporation chamber (FIG. 1), i.e. concentrated (consequence: high temperatures required), but can also be introduced distributed over the height course of the structure of height h (consequence: only low temperatures required, i.e. only heat as many height meters as required). If the device for recovery of energy/heat, e.g. in the case of a solar collector, is designed in this way, the collector and structure of height h coincide. In any other case in which also only low starting temperatures for evaporation or transport energies are present, the same applies. Thus, for these embodiments the fundamental process sequence with the following stations applies: That of evaporation—with not necessarily sufficient transport energy to bridge height h, that of recovery and introduction of energy (heat) for transporting the carrier medium to recover potential energy and compensation for losses (the carrier medium here also simultaneously fulfils the function of a transport medium for a possibly temporary excess energy recovery), that of condensing and recovering latent energies (said latent energies are the evaporation heat and the heat of the carrier medium) after reaching height h, said energies are then supplied back to the evaporation, and that of recovering useful energy and returning the carrier medium to the evaporator. Here too, all embodiments already cited above are possible for the purpose of obtaining drinking water or cleaning waste water etc., and open and/or closed circuits (see also FIG. 3).

The energy and/or energy carriers which we need or believe we need to structure our environment can e.g. be electrical energy or chemical energy carriers or physical energy carriers e.g. hydrogen and oxygen from electrolysis, or pump energy such as energy for distillation.

The advantage of this method and/or device for recovering energy, in the case of use of input energy carriers such as geothermal heat, air or water heat, and solar energy, is the absolute absence of emissions of substances that contaminate the environment.

For delimitation:
the method and/or device presented here for recovering energy is not a solar chimney power plant (solar chimney power plants belong to the group of thermal power plants, as does the method and/or device for recovering energy presented here). A solar chimney power plant is a non-essential component of the power plant presented here.
the energy recovery method and/or device presented here is not a sea water thermal power plant. The heat of sea water is merely one solution for structure of the energy source.
the energy recovery method and/or device presented here is not a geothermal power plant. Geothermal heat is merely a further solution for structure of the energy source.

In the case where ground heat is used as an energy source, it can be considered to use existing shaft systems e.g. in the Ruhr area. Thus, the start-up costs for development are minimised and also the construction time to first commissioning reduced. This heat recovery could take place e.g. in the galleries, and the shafts would form the structures of height h, and there is also then at ground level the possibility of a storage lake for the condensate which can serve the function of "storage power plant" for control and operation of peak load distribution.

Figure 5:
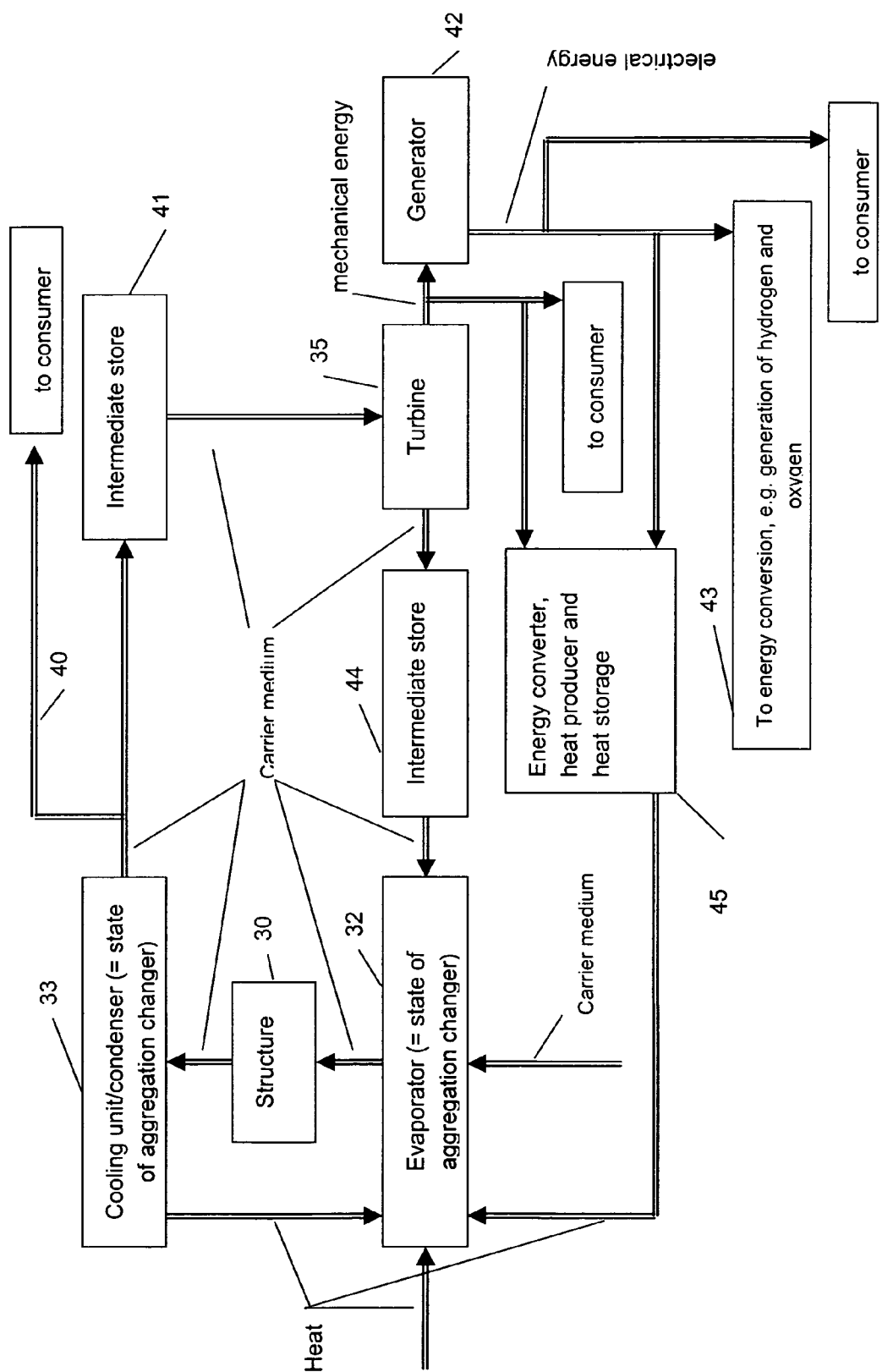
FIG. 5 shows diagrammatically the structure of a further example device according to the invention.

FIG. 5 schematically illustrates the structure of a further inventive device. The device corresponds to the device described with reference to FIG. 4. However an element for energy conversion, heat production and heat storage 45—arranged between turbine 35 and/or generator 42 on the one hand and evaporator 32 on the other hand—has been added. Such a device is exemplary for the following embodiments:

In a further embodiment of the method and/or device of energy the energy recovered by the method and/or device is introduced in the form of heat into a storage (FIG. 5) (45). From this the heat is again fed into the energy recovery cycle as required. This heat storage can have as a storage medium in various embodiments for example iron or another metal or simply consist of stone (for example basalt, granite, marble, fireclay etc.), or a liquid for example brine, molten salt or molten metal.

The advantage of this type of intermediate storage is the procurable much higher energy density in comparison to the storage of the carrier medium and thus weight at great height and therefore a substantially lower cost results. At the same time there is the possibility of heat being continually fed into the evaporation process, which in some embodiments leads to the fact that no negative pressure arises in the building; this also provides some structural advantages.

The capacity of this method is shown by the example of 365 heat storages consisting of basalt (0.84 kJ/kg*K, 3000 kg/m3), which are heated to 600° C. and each has a volume of 300×300×300 m3. The heat quantity stored therein results in 15,000 Peta Joules, which rounded up corresponds to the annual requirements of the Federal Republic of Germany for primary energy during the year 2005. This amount of heat can be generated by means of the method and/or the device for recovering energy illustrated here and can be available again to be used in other energy carriers.

Figure 6:
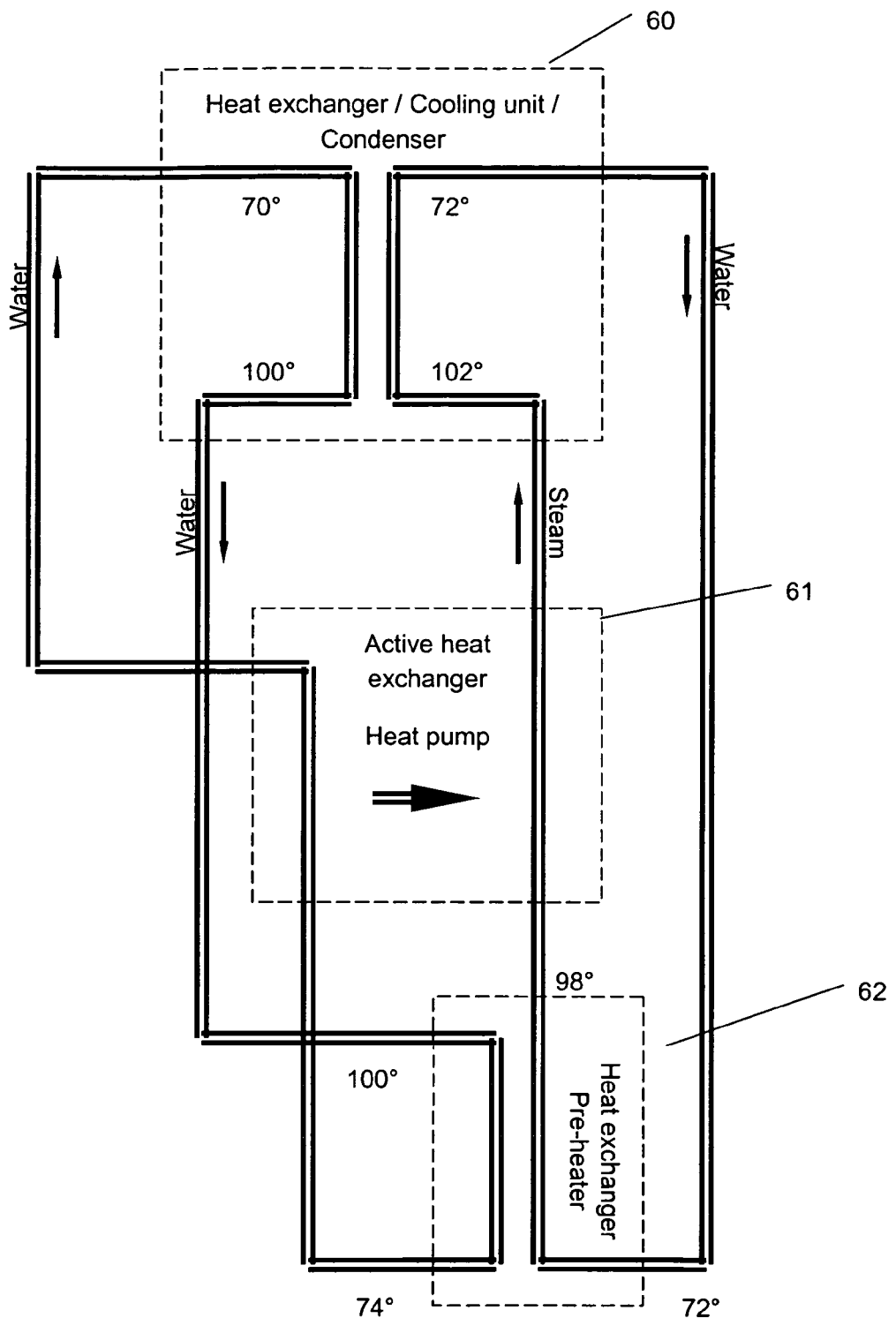
FIG. 6 shows diagrammatically an exemplary recovery of heat in a device according to the invention.

In a further embodiment of the method and/or the device for recovering energy the return of heat just as the new introduction of vaporization heat and optionally also the re-introduction of the basic heat of the carrier medium are performed in each case by a heat exchanger. These are expediently connected together by pipes in each case (FIG. 6). Thus: one heat exchanger collects the energy from the steam and/or the condensate of the carrier medium—this is the cooling unit—and transfers this to the transport medium. The other returns this collected energy in the evaporator back to the carrier medium for evaporating—this is then the evaporator. These heat exchangers in various embodiments can be passive (=counter-flow, parallel-flow, cross-flow heat exchangers) and/or active (=heat pump).

If in an embodiment for heat transmission, passive heat exchangers are used by preference, since passive heat exchangers are not ideal, in one embodiment at least one further heat exchanger must be incorporated for transmitting the residual heat not transferred by the passive heat exchangers for transmission of this to the evaporation process, or however in a further embodiment this residual heat is dissipated by the heat exchanger into the environment of the method and/or the device for recovering energy and must then be again compensated by an external energy input, increased by this amount, to the evaporation process. The incorporation of this active heat exchanger is more expediently, but not necessarily carried out at the site of the evaporator, where the transmission paths of this residual heat to the evaporation process are short.

An example (FIG. 6) illustrates the flow of heat: it is assumed that the heat exchangers are counter-flow heat exchangers and the carrier, as the transport medium, is water and the flow temperature of the transport medium to the cooling unit (60) is 70° C. and the outflow temperature is 100° C., the temperature of the steam of the carrier medium at the inlet of the counter flow is 102° C. and at the outflow is 72° C., the flow temperature of the transport medium to the evaporator is 100° C., which in turn meets a carrier medium at 72° C. If this passive counter-flow heat exchanger of the evaporator (62) is now designed similarly to that of the cooling unit, a carrier medium at 98° C. and a transport medium at 74° C. are present in the outflow. At the same time, this passive heat exchanger however can only release a fraction of the energy buffered in the transport medium and thus for the cooling unit to again reach the flow temperature of 70° C. necessary for operation, the residual heat must be actively dissipated and thus the temperature of the transport medium must be again reduced by 4° C. This is done by means of a heat pump (61) (=principle of the refrigerator) wherein the heat is expediently pumped in such a manner that it can be fed back into the evaporation process for evaporation.

It is evident that the embodiments described are merely examples which can be modified and/or supplemented in various ways within the context of the claims.

The invention claimed is:

1. A method for converting energy, comprising:
    a) conversion of a non-gaseous carrier medium into a gaseous carrier medium by the introduction of thermal energy, so that the gaseous carrier medium rises and gains potential energy;
    b) back-conversion of the gaseous carrier medium at a specified height into a non-gaseous carrier medium by cooling the gaseous carrier medium via a transport medium;
    c) conversion of the potential energy of the recovered non-gaseous carrier medium into another energy form; and
    d) utilizing a heating of the transport medium resulting from the cooling of the carrier medium to make a contribution, by means of a heat pump, to the thermal energy introduced.

2. The method according to claim 1, wherein the thermal energy is introduced into the carrier medium distributed over the height traveled by the gaseous carrier medium.

3. The method according to claim 1, wherein the introduced thermal energy comprises energy recovered from geothermal heat, water heat, air heat, a fossil energy carrier, a nuclear energy carrier and/or solar energy.

4. The method according to claim 1, wherein the cooling takes place in that a transport medium is passed through cooling areas arranged at the specified height.

5. The method according to claim 1, wherein to support the back conversion a substance is introduced directly into the carrier medium.

6. The method according to claim 1, wherein the recovered non-gaseous carrier medium is temporarily stored before conversion of the recovered potential energy of the carrier medium into another energy form.

7. The method according to claim 1, wherein to convert the potential energy of the carrier medium into another energy form, the potential energy is firstly converted into kinetic energy by dropping the recovered non-gaseous carrier medium from a greater height to a lesser height and then the kinetic energy is converted into another energy form.

8. The method according to claim 1, wherein the potential energy is converted into mechanical energy, electrical energy, energy to generate a chemical energy carrier and/or energy to generate a physical energy carrier.

9. The method according to claim 1, wherein the recovered non-gaseous carrier medium is temporarily stored after conversion of the potential energy into another energy form.

10. The method according to claim 1, wherein the recovered non-gaseous carrier medium, after conversion of the potential energy into another energy form, is used further at least partly in a closed circuit which continues with step a).

11. The method according to claim 1, wherein the non-gaseous carrier medium in step a) is distilled by conversion into a gaseous carrier medium, and wherein the distilled recovered non-gaseous carrier medium is at least partly extracted before or after conversion of the potential energy into another energy form.

12. The method according to claim 1, wherein the gaseous carrier medium rises in a cavity comprising a filling medium that is carried along by the carrier medium.

13. The method according to claim 1, wherein to convert the potential energy of the carrier medium into another energy form, the recovered non-gaseous carrier medium is dropped from a greater height to a lesser height to drive a turbine arranged at the lesser height.

14. The method according to claim 1, wherein the cooling of the gaseous carrier medium via a transport medium is performed by means of a collector, which has a cooling unit that is configured for through-flow of the transport medium to cool the gaseous carrier medium, and wherein utilizing the heating of the transport medium resulting from the cooling of the carrier medium comprises guiding the transport medium heated by the cooling of the carrier medium to the aggregation state changer by means of a heat return line.

15. The method according to claim 14, wherein the transport medium is specifically heated by the cooling of the carrier medium.

16. The method according to claim 1, wherein utilizing the heating of the transport medium resulting from the cooling of the carrier medium comprises guiding the transport medium heated by the cooling of the carrier medium to the aggregation state changer by means of a heat return line and wherein the heat return line is used to enable an additional contribution only to the thermal energy introduced.

17. A device for conversion of energy, comprising:
a cavity;
an aggregation state changer arranged at the lower end of the cavity and configured to convert a non-gaseous carrier medium into a gaseous carrier medium by the introduction of thermal energy so that the carrier medium rises in the cavity and gains potential energy;
a collector arranged at the upper end of the cavity and configured to collect a non-gaseous carrier medium recovered from the gaseous carrier medium, wherein the collector has a cooling unit that is configured for through-flow of a transport medium to cool the gaseous carrier medium to convert the gaseous carrier medium back into a non-gaseous carrier medium;
an energy conversion arrangement configured to convert the potential energy of the recovered non-gaseous carrier medium into another energy form; and
a heat return line configured to guide the transport medium heated by the cooling of the carrier medium to the aggregation state changer in order to contribute, by means of a heat pump, to the thermal energy introduced.

18. The device according to claim 17, further comprising an energy introduction element configured to introduce thermal energy distributed over the height of the cavity.

19. The device according to claim 17, further comprising an energy recovery element configured to recover introduced thermal energy from geothermal heat, water heat, air heat, fossil energy carriers, nuclear energy carriers and/or solar energy.

20. The device according to claim 17, wherein the cooling unit has cooling areas through which a transport medium flows in order to cool the gaseous carrier medium.

21. The device according to claim 17, wherein the collector has means for introduction of a substance directly into the carrier medium to support the back-conversion of the gaseous carrier medium into a non-gaseous carrier medium.

22. The device according to claim 17, further comprising an intermediate store configured for intermediate storage of the recovered non-gaseous carrier medium before conversion of the potential energy of the carrier medium into another energy form.

23. The device according to claim 17, wherein the energy conversion arrangement comprises a fall path arranged to convert the potential energy into kinetic energy by dropping the recovered non-gaseous carrier medium from a greater height to a lesser height, and an energy converter configured to convert the kinetic energy into another energy form.

24. The device according to claim 17, wherein the energy conversion arrangement is configured to convert the potential energy of the recovered non-gaseous carrier medium into mechanical energy, electrical energy, energy to generate a chemical energy carrier or energy to generate a physical energy carrier.

25. The device according to claim 17, further comprising an intermediate store configured for intermediate storage of the recovered non-gaseous carrier medium after conversion of the potential energy into another energy form.

26. The device according to claim 17, wherein the energy conversion arrangement is arranged such that the recovered non-gaseous carrier medium, after conversion of the potential energy into another energy form, is supplied back to the aggregation state changer arranged at the lower end of the cavity.

27. The device according to claim 17, wherein the non-gaseous carrier medium is distilled by conversion into a gaseous carrier medium, further comprising an extraction connection configured for at least partial extraction of the recovered non-gaseous carrier medium before or after conversion of the potential energy into another energy form.

28. The device according to claim 17, wherein the cavity comprises a filling medium that is carried along by the carrier medium.

29. A system comprising a device according to claim 16 and at least one device configured to recover thermal energy that is made available to the device, said at least one device comprising
a cavity;
an aggregation state changer arranged at the lower end of the cavity and configured to convert a non-gaseous carrier medium into a gaseous carrier medium by the introduction of thermal energy so that the carrier medium rises in the cavity and gains potential energy;
a collector arranged at the upper end of the cavity and configured to collect a non-gaseous carrier medium recovered from the gaseous carrier medium; and
an energy conversion arrangement configured to convert the potential energy of the recovered non-gaseous carrier medium into another energy form.

30. The device according to claim 17, wherein the energy conversion arrangement comprises a fall path configured to enable a dropping of the recovered non-gaseous carrier medium from a greater height to a lesser height, and wherein the energy conversion arrangement comprises a turbine which is arranged at the lesser high and which is configured to be driven by dropping carrier medium.

31. The device according to claim 17, wherein the heat return line is used to enable an additional contribution only to the thermal energy introduced.

32. The device according to claim 17, wherein the cooling unit is specifically configured to support a heating of the transport medium by the cooling of the carrier medium.

* * * * *